(12) United States Patent
Wang et al.

(10) Patent No.: US 8,774,284 B2
(45) Date of Patent: Jul. 8, 2014

(54) SIGNALING OF MULTIPLE DECODING TIMES IN MEDIA FILES

(75) Inventors: Ye-Kui Wang, Tampere (FI); Miska Hannuksela, Ruutana (FI)

(73) Assignee: Nokia Corporation, Espoo (FI)

( * ) Notice: Subject to any disclaimer, the term of this patent is extended or adjusted under 35 U.S.C. 154(b) by 1522 days.

(21) Appl. No.: 12/150,018

(22) Filed: Apr. 24, 2008

(65) Prior Publication Data

US 2008/0292003 A1 Nov. 27, 2008

(51) Int. Cl.
 H04N 7/12 (2006.01)
 H04N 7/50 (2006.01)

(52) U.S. Cl.
 CPC .................................. H04N 7/50 (2013.01)
 USPC .................................. 375/240.25

(58) Field of Classification Search
 CPC ..................................... H04N 7/50
 USPC .................................... 375/240.25
 See application file for complete search history.

(56) References Cited

U.S. PATENT DOCUMENTS

| | | | |
|---|---|---|---|
| 5,671,226 A | 9/1997 | Murakami et al. | 370/474 |
| 7,346,698 B2 | 3/2008 | Hannaway | 709/231 |
| 2002/0064224 A1* | 5/2002 | Hata et al. | 375/240.01 |
| 2003/0103074 A1 | 6/2003 | Jasinschi | 345/716 |
| 2003/0147464 A1 | 8/2003 | Amielh-Caprioglio et al. | 375/240.08 |
| 2003/0161425 A1 | 8/2003 | Kikuchi | 375/354 |
| 2005/0044499 A1 | 2/2005 | Allen et al. | 715/704 |
| 2006/0209966 A1 | 9/2006 | Walker | 375/240.25 |
| 2007/0022329 A1 | 1/2007 | Adamek et al. | 714/701 |
| 2007/0116277 A1* | 5/2007 | Ro et al. | 380/201 |
| 2007/0121625 A1 | 5/2007 | Youn et al. | 370/389 |
| 2007/0171903 A1 | 7/2007 | Zeng et al. | 370/389 |
| 2007/0176949 A1 | 8/2007 | Chang et al. | 345/690 |
| 2008/0013621 A1 | 1/2008 | Wang et al. | 375/240.01 |

FOREIGN PATENT DOCUMENTS

| | | |
|---|---|---|
| WO | WO-2007/035065 A1 | 3/2007 |
| WO | WO-2007/042914 A1 | 4/2007 |
| WO | WO-2008/007337 A2 | 1/2008 |
| WO | WO-2008/010157 A2 | 1/2008 |
| WO | WO-2008008212 A1 | 1/2008 |

OTHER PUBLICATIONS

Amon, et al., "File Format for Scalable Video Coding (SVC)", (2006), (12 pages).

(Continued)

*Primary Examiner* — Sath V Perungavoor
*Assistant Examiner* — James Pontius
(74) *Attorney, Agent, or Firm* — Harrington & Smith

(57) ABSTRACT

The exemplary embodiments of this invention provide in one aspect thereof an ability to signal multiple decoding times for each sample in a file format level in order to allow, for example, different decoding times for each sample (or sample subset) between decoding an entire stream and decoding a subset of the stream. An alternate decoding time box is specified to allow for the signaling of multiple decoding times for each sample. Such a box can contain a compact version of a table that allows indexing from an alternate decoding time to a sample number, where an alternate decoding time is a decoding time to be used with a sample when only a subset of an elementary stream stored in a track is to be decoded. Furthermore, each entry in the table provides the number of consecutive samples with the same time delta, and the delta between those consecutive samples. By adding the deltas a complete time-to-sample map can be constructed.

17 Claims, 10 Drawing Sheets

WHERE THE ALTERNATE DECODING TIME DATA IS EXPRESSED AS A DELTA VALUE THAT REPRESENTS AN ADJUSTMENT FOR THE DECODING TIME OF THE AT LEAST ONE SAMPLE

WHERE STORING ALTERNATE DECODING TIME DATA STORES, IN ASSOCIATION WITH THE DELTA, AN IDENTIFIER IDENTIFYING A SCALABILITY LAYER FOR THE AT LEAST ONE SAMPLE.

(56) References Cited

OTHER PUBLICATIONS

Rummler, et al., "Extension of the Extractor NAL unit in the SVC File Format VM", (Jan. 2006), (3 pages).
"File Format for Scalable Video Coding", Peter Amon et al., IEEE Transactions on Circuits and Systems for Video Technology, vol. 17, No. 9, Sep. 2007, pp. 1174-1185.
"Joint Draft 9 of SVC Amendment", $22^{nd}$ JVT meeting, Marrakech, Morocco, Jan. 2007, 482 pgs.
"Joint Draft 2.0 on Multiview Video Coding", $22^{nd}$ JVT meeting, Marrakech, Morocco, Jan. 2007, 28 pgs.
Miska Hannuksela, "Signaling of Timestamps", Joint Video Team (JVT) of ISO/IEC MPEG & ITU-T VCEG, JVT-C070, May 6-10, 2002, XP030005179, Sections 4 and 5.
Heiko Schwarz et al., "Overview of the Scalable Extension of the H.264/MPEG-4 AVC Video Coding Standard", Video Standards and Drafts, XX, XX, No. JVT-U145, Oct. 20, 2006, XP030006791, Section 4.
Ye-Kui Wang et al., "On SVC File Format", Video Standards and Drafts, XX, XX, No. M14526, Apr. 18, 2007, XP030043163, Section 6.
Ye-Kui Wang et al., "On SVC Scalability Information Related SEI Messages", Video Standards and Drafts, XX, XX, No. JVT-W051, Apr. 18, 20007, XP030007011, the whole document.
Ying Chen et al., "View Scalability Information Sei Message for MVC", Video Standards and Drafts, XX, XX, No. JVT-W037, Apr. 23, 2007, XP030006997, the whole document.
Kathrin Rummler, Thomas Schierl "Coding of Moving Pictures and Audio", International Organisation for Standardisation Organisation Internationale De Normalisation ISO/IEC JTC1/SC29/WG11 ISO/IEC JTC1/SC29/WG11, MPEG2006 M13012, Jan. 2006, Bangkok, Thailand, Table 1.

\* cited by examiner

WHERE STORING ALTERNATE DECODING TIME DATA STORES, IN ASSOCIATION WITH THE DELTA, AN IDENTIFIER IDENTIFYING A SCALABILITY LAYER FOR THE AT LEAST ONE SAMPLE

FIG. 5A

WHERE STORING ALTERNATE DECODING TIME DATA STORES, IN ASSOCIATION WITH THE DELTA, AN IDENTIFIER IDENTIFYING A TEMPORAL LAYER FOR THE AT LEAST ONE SAMPLE

FIG. 5B

WHERE THE ALTERNATE DECODING TIMING DATA IS STORED IN A BOX, THE BOX BEING CHARACTERIZED BY:

AN IDENTIFIER IDENTIFYING A SCALABILITY LAYER FOR THE AT LEAST ONE SAMPLE; AND

A SAMPLE DELTA REPRESENTATIVE OF A DIFFERENCE BETWEEN THE ALTERNATE DECODING TIME AND THE DECODING TIME FOR DECODING THE ENTIRE STREAM FOR THE AT LEAST ONE SAMPLE IN A TIME-SCALE OF MULTIMEDIA CONTENT REPRESENTED BY THE CODED MULTIMEDIA CONTENT

WHERE THE ALTERNATE DECODING TIME DATA IS EXPRESSED AS A DELTA VALUE THAT REPRESENTS AN ADJUSTMENT FOR THE DECODING TIME OF THE AT LEAST ONE SAMPLE

FIG. 6B

WHERE STORING ALTERNATE DECODING TIME DATA STORES, IN ASSOCIATION WITH THE DELTA, AN IDENTIFIER IDENTIFYING A SCALABILITY LAYER FOR THE AT LEAST ONE SAMPLE.

FIG. 6C

STORING ALTERNATE DECODING TIME DATA STORES, IN ASSOCIATION WITH THE DELTA, AN IDENTIFIER IDENTIFYING A TEMPORAL LAYER FOR THE AT LEAST ONE SAMPLE

FIG. 6D

WHERE THE ALTERNATE DECODING TIMING DATA IS STORED IN A BOX, THE BOX BEING CHARACTERIZED BY:

AN IDENTIFIER IDENTIFYING A SCALABILITY LAYER FOR THE AT LEAST ONE SAMPLE; AND

A SAMPLE DELTA REPRESENTATIVE OF A DIFFERENCE BETWEEN THE ALTERNATE DECODING TIME AND THE DECODING TIME FOR DECODING THE ENTIRE STREAM FOR THE AT LEAST ONE SAMPLE IN A TIME-SCALE OF MULTIMEDIA CONTENT REPRESENTED BY THE CODED MULTIMEDIA CONTENT

COMPUTER READABLE MEDIUM, e.g., MEMORY 58

CONTAINER FILE COMPRISING:

A PLURALITY OF TRACKS;

FIRST TIMING DATA CONTAINED IN A TRACK BOX, THE FIRST TIMING DATA DESCRIBING DECODING TIME OF AT LEAST ONE SAMPLE OF A CODED MULTIMEDIA CONTENT STORED WITHIN AN ASSOCIATED MEDIA DATA BOX;

ALTERNATE TIMING DATA CONTAINED IN THE BOX FOR SIGNALING THE ALTERNATE TIMING DATA FOR THE AT LEAST ONE SAMPLE OF THE CODED MULTIMEDIA CONTENT, THE ALTERNATE DECODING TIME DATA BEING EXPRESSED AS A DELTA VALUE THAT REPRESENTS AN ADJUSTMENT FOR THE DECODING TIME OF THE AT LEAST ONE SAMPLE; AND

AN IDENTIFIER IDENTIFYING A SCALABILITY LAYER FOR THE AT LEAST ONE SAMPLE

FIG. 9

SIGNALING OF MULTIPLE DECODING TIMES IN MEDIA FILES

CLAIM OF PRIORITY FROM COPENDING PROVISIONAL PATENT APPLICATION

This patent application claims priority under 35 U.S.C. §119(e) from Provisional Patent Application No. 60/913,764, filed Apr. 24, 2007, the disclosure of which is incorporated by reference herein in its entirety.

FIELD OF THE INVENTION

The present invention relates generally to the field of media content storage. More particularly, the present invention relates to signaling multiple decoding times in media files.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC). In addition, there are currently efforts underway with regards to the development of new video coding standards. One such standard under development is the SVC standard, which will become the scalable extension to H.264/AVC. Another standard under development is the multi-view coding standard (MVC), which is also an extension of H.264/AVC. Yet another such effort involves the development of China video coding standards.

A draft of the SVC standard is described in JVT-V201, "Joint Draft 9 of SVC Amendment", 22nd JVT meeting, Marrakech, Morocco, January 2007. A draft of the MVC standard is in described in JVT-V209, "Joint Draft 2.0 on Multiview Video Coding", 22nd JVT meeting, Marrakech, Morocco, January 2007.

Scalable media is typically ordered into hierarchical layers of data, where a video signal can be encoded into a base layer and one or more enhancement layers. A base layer can contain an individual representation of a coded media stream such as a video sequence. Enhancement layers can contain refinement data relative to previous layers in the layer hierarchy. The quality of the decoded media stream progressively improves as enhancement layers are added to the base layer. An enhancement layer enhances the temporal resolution (i.e., the frame rate), the spatial resolution, and/or simply the quality of the video content represented by another layer or part thereof. Each layer, together with all of its dependent layers, is one representation of the video signal at a certain spatial resolution, temporal resolution and/or quality level. Therefore, the term "scalable layer representation" is used herein to describe a scalable layer together with all of its dependent layers. The portion of a scalable bitstream corresponding to a scalable layer representation can be extracted and decoded to produce a representation of the original signal at a certain fidelity.

The earliest type of scalability introduced to video coding standards was temporal scalability with B pictures in MPEG-1 Visual. According to this B picture temporal scalability, a B picture is bi-predicted from two pictures, one picture precedes the B picture and the other picture succeeds the B picture, both in display order. In addition, a B picture is a non-reference picture, i.e., it is not used for inter-picture prediction reference by other pictures. Consequently, B pictures can be discarded to achieve a temporal scalability point with a lower frame rate. The same mechanism was retained in MPEG-2 Video, H.263 and MPEG-4 Visual.

In H.264/AVC, the concept of B pictures or B slices has been generalized. A block in a B slice may be predicted from two reference pictures in the same direction in display order, and a picture consisting of B slices may be referred to by other pictures for inter-picture prediction. Both the bi-directional prediction property and the non-reference picture property of conventional B picture temporal scalability are no longer valid.

In H.264/AVC, SVC and MVC, temporal scalability can be achieved by using non-reference pictures and/or hierarchical inter-picture prediction structure described in greater detail below. It should be noted that by using only non-reference pictures, it is possible to achieve similar temporal scalability as that achieved by using conventional B pictures in MPEG-1/2/4. This can be accomplished by discarding non-reference pictures. Alternatively, use of a hierarchical coding structure can achieve a more flexible temporal scalability.

FIG. 1 illustrates a conventional hierarchical coding structure with four levels of temporal scalability. A display order is indicated by the values denoted as picture order count (POC). The I or P pictures, also referred to as key pictures, are coded as a first picture of a group of pictures (GOPs) in decoding order. When a key picture is inter coded, the previous key pictures are used as a reference for inter-picture prediction. Therefore, these pictures correspond to the lowest temporal level (denoted as TL in FIG. 1) in the temporal scalable structure and are associated with the lowest frame rate. It should be noted that pictures of a higher temporal level may only use pictures of the same or lower temporal level for inter-picture prediction. With such a hierarchical coding structure, different temporal scalability corresponding to different frame rates can be achieved by discarding pictures of a certain temporal level value and beyond.

For example, referring back to FIG. 1, pictures 0, 108, and 116 are of the lowest temporal level, i.e., TL 0, while pictures 101, 103, 105, 107, 109, 111, 113, and 115 are of the highest temporal level, i.e., TL 3. The remaining pictures 102, 106, 110, and 114 are assigned to another TL in hierarchical fashion and compose a bitstream of a different frame rate. It should be noted that by decoding all of the temporal levels in a GOP, the highest a frame rate can be achieved. Lower frame rates can be obtained by discarding pictures of certain temporal levels. It should be noted that a temporal scalable layer with a lower temporal level or a lower frame rate can also be referred to as a lower temporal layer.

The hierarchical B picture coding structure described above is a typical coding structure for temporal scalability. However, it should be noted that more flexible coding structures are possible. For example, the GOP size does not have to be constant over time. Alternatively still, temporal enhancement layer pictures do not have to be coded as B slices, but rather may be coded as P slices.

The concept of a video coding layer (VCL) and a network abstraction layer (NAL) is inherited from advanced video coding (AVC). The VCL contains the signal processing functionality of the codec, e.g., mechanisms such as transform, quantization, motion-compensated prediction, loop filter, and inter-layer prediction. A coded picture of a base or enhancement layer consists of one or more slices. The NAL encapsulates each slice generated by the VCL into one or more NAL units.

Each SVC layer is formed by NAL units, representing the coded video bits of the layer. A Real Time Transport Protocol (RTP) stream carrying only one layer would carry NAL units belonging to that layer only. An RTP stream carrying a complete scalable video bit stream would carry NAL units of a base layer and one or more enhancement layers. SVC specifies the decoding order of these NAL units.

In some cases, data in an enhancement layer can be truncated after a certain location, or at arbitrary positions, where each truncation position may include additional data representing increasingly enhanced visual quality. In cases where the truncation points are closely spaced, the scalability is said to be "fine-grained", hence the term "fine grained (granular) scalability" (FGS). In contrast to FGS, the scalability provided by those enhancement layers that can only be truncated at certain coarse positions is referred to as "coarse-grained (granularity) scalability" (CGS). In addition, the draft SVC coding standard noted above can also support what is conventionally referred to as "medium grained (granular) scalability" (MGS). According to MGS, quality enhancement pictures are coded similarly to CGS scalable layer pictures, but can be indicated by high-level syntax elements as is similarly done with FGS layer pictures. It may be noted that enhancement layers can collectively include CGS, MGS, and FGS quality (SNR) scalability and spatial scalability.

According to H.264/AVC, an access unit comprises one primary coded picture. In some systems, detection of access unit boundaries can be simplified by inserting an access unit delimiter NAL unit into the bitstream. In SVC, an access unit may comprise multiple primary coded pictures, but at most one picture per each unique combination of dependency_id, temporal_id, and quality_id. A coded picture as described herein can refer to all of the NAL units within an access unit having particular values of dependency_id and quality_id. It is noted that the terms to be used in SVC can change. Therefore, what may be referred to as a coded picture herein may be subsequently referenced by another term, such as a layer representation.

SVC uses a similar mechanism as that used in H.264/AVC to provide hierarchical temporal scalability. In SVC, a certain set of reference and non-reference pictures can be dropped from a coded bitstream without affecting the decoding of the remaining bitstream. Hierarchical temporal scalability requires multiple reference pictures for motion compensation, i.e., there is a reference picture buffer containing multiple decoded pictures from which an encoder can select a reference picture for inter prediction. In H.264/AVC, a feature called sub-sequences enables hierarchical temporal scalability, where each enhancement layer contains sub-sequences and each sub-sequence contains a number of reference and/or non-reference pictures. The sub-sequence is also comprised of a number of inter-dependent pictures that can be disposed without any disturbance to any other sub-sequence in any lower sub-sequence layer. The sub-sequence layers are hierarchically arranged based on their dependency on each other and are equivalent to temporal levels in SVC. Therefore, when a sub-sequence in the highest sub-sequence layer is disposed, the remaining bitstream remains valid. In H.264/AVC, signaling of temporal scalability information is effectuated by using sub-sequence-related supplemental enhancement information (SEI) messages. In SVC, the temporal level hierarchy is indicated in the header of NAL units.

The file format is an important element in the chain of multimedia content production, manipulation, transmission and consumption. There is a difference between the coding format and the file format. The coding format relates to the action of a specific coding algorithm that codes the content information into a bitstream. In contrast, the file format comprises a system/structure(s) for organizing a generated bitstream in such way that it can be accessed for local decoding and playback, transferred as a file, or streamed, all utilizing a variety of storage and transport architectures. Further, the file format can facilitate the interchange and editing of the media. For example, many streaming applications require a pre-encoded bitstream on a server to be accompanied by metadata, stored in the "hint-tracks", that assists the server to stream the video to the client. Examples of information that can be included in hint-track metadata include timing information, indications of synchronization points, and packetization hints. This information is used to reduce the operational load of the server and to maximize the end user experience.

One available media file format standard includes the object-oriented, ISO base media file format file structure, where a file can be decomposed into its constituent objects and the structure of the constituent objects can be inferred directly from their type and position. In addition, the ISO base media file format is designed to contain timed media information for a presentation in a flexible, extensible format, which facilitates interchange, management, editing, and presentation of the media. The actual files have a logical structure, a time structure, and a physical structure, although these structures need not be coupled.

The logical structure of the file can be likened to that of a "movie", which contains a set of time-parallel tracks. The time structure of the file is represented by the tracks containing sequences of samples in time, and those sequences are mapped into a timeline of the overall movie by optional edit lists. The physical structure of the file separates the data needed for logical, time, and structural de-composition, from the media data samples themselves. This structural information is represented by the tracks documenting the logical and timing relationships of the samples and also contains pointers to where they are located. The pointers can reference the media data within the same file or within another one, referenced, for example, by a uniform resource locator.

Each media stream is contained in a track specialized for that media type (audio, video, etc.), and is further parameterized by a sample entry. The sample entry contains the "name" of the exact media type (i.e., the type of decoder needed to decode the stream) and any parameterization of that decoder that is needed. In addition, tracks are synchronized by the time stamps of the media samples. Furthermore, tracks can be linked together by track references, where the tracks can form alternatives to each other, e.g., two audio tracks containing different languages.

Some samples within a track have special characteristics or need to be individually identified, e.g., synchronization points (often a video I-frame). These synchronization points are identified by a special table in each track. More generally, the nature of dependencies between track samples can also be documented. Furthermore, a concept of named, parameterized sample groups can be utilized. These named, parameterized sample groups permit the documentation of arbitrary characteristics, which are shared by some of the samples in a track. In the SVC file format, sample groups are used to describe samples with a certain NAL unit structure.

All files start with a file-type box that defines the best use of the file and the specifications to which the file complies, which are documented as "brands." The presence of a brand in a file-type box indicates both a claim and a permission: a claim by the file writer that the file complies with the specification; and a permission for a reader, possibly implementing only that specification, to read and interpret the file.

In the case of the movie structure described above, the "movie" box can contain a set of "track" boxes, e.g., a track box for a video track, a track box for an audio track, and a track box for a hint track. In turn, each track can contain for one stream, information including, but not limited to timing, nature of the material, e.g., video, audio, etc., visual information, initialization information (e.g., sample entry tables), and information on where coding data can be found, its size, et. In other words, a track box can contain metadata related to the actual media content data. For example, each track can contain, among other elements, a sample table box with a sample description box, where the sample description box holds certain information, e.g., the information contained in the decoder configuration record for MPEG-4 AVC video, which is needed by the decoder in order to initialize. Furthermore, the sample table box holds a number of tables, which contain timing information and pointers to the media data. In other words, the video and audio data can be stored interleaved in chunks within a media data container/box. Lastly, the hint track can contain precomputed instructions on how to process the file for streaming.

In addition, with SVC, it is possible to signal information regarding multiple decoding times using SEI messages. However, extracting the required decoding times from an SEI message requires a file reader to be equipped with entropy decoders. In addition, parsing of media data samples to find SEI messages that contain information regarding decoding times can also be a burden. Such requirements, therefore, can result in adding implementation and computational complexities to those servers that offer subsets of stored bitstreams. The ISO base media file format and its derivatives (e.g., the SVC file format) allow for signaling a decoding time for each sample containing one access unit. However, for scalable media, when only a subset of samples or sample subsets are required to be decoded, the decoding time of each sample or sample subset would be different than when the entire stream is to be decoded.

SUMMARY

In a first aspect the exemplary embodiments in accordance with this invention provide a method that includes storing first timing data into a track box of a media file, the first timing data describing decoding time of at least one sample of a coded multimedia content stored within an associated media data box of the media file, and storing alternate decoding time data for the at least one sample of the coded multimedia content, the alternate decoding time data being expressed as a delta value that represents an adjustment for the decoding time of the at least one sample.

In another aspect the exemplary embodiments in accordance with this invention provide a method that includes storing first timing data into a track box of a media file, the first timing data describing decoding time of at least one sample of a coded multimedia content stored within an associated media data box of the media file, and storing an alternate decoding timing data for the at least one sample of the coded multimedia content for use if a subset of the coded multimedia content is to be decoded.

In another aspect the exemplary embodiments in accordance with this invention provide an apparatus that includes a processor and a memory unit coupled with the processor. The apparatus further comprises an encoder that is configured to store first timing data into a track box of a media file, the first timing data describing decoding time of at least one sample of a coded multimedia content stored within an associated media data box of the media file, and to store alternate decoding time data for the at least one sample of the coded multimedia content, the alternate decoding time data being expressed as a delta value that represents an adjustment for the decoding time of the at least one sample.

In a further aspect the exemplary embodiments in accordance with this invention provide a method that includes parsing a media file comprising a media bitstream and first timing data describing decoding time of at least one sample of the media bitstream; determining whether to one of decode the media bitstream in its entirety and decode a subset of the media bitstream; upon a determination to decode the subset of the media bitstream, parsing an alternate decoding timing data for the at least one sample of the subset of the media bitstream, and decoding the subset of media bitstream according to the alternate decoding timing data.

In a further aspect the exemplary embodiments in accordance with this invention provide an apparatus that includes a processor and a memory unit operatively connected to the processor. The apparatus further comprises a file parser to parse a media file comprising a media bitstream and first timing data describing decoding time of at least one sample of the media bitstream; determine whether to one of decode the media bitstream in its entirety and decode a subset of the media bitstream; upon a determination to decode the subset of the media bitstream, parse an alternate decoding timing data for the at least one sample of the subset of the media bitstream. The apparatus further includes a decoder to decode the subset of media bitstream according to the alternate decoding timing data.

In yet another aspect the exemplary embodiments in accordance with this invention provide a computer readable medium that stores a container file having a plurality of tracks; first timing data contained in a track box, the first timing data describing decoding time of at least one sample of a coded multimedia content stored within an associated media data box; alternate timing data contained in the box for signaling the alternate timing data for the at least one sample of the coded multimedia content, the alternate decoding time data being expressed as a delta value that represents an adjustment for the decoding time of the at least one sample; and an identifier identifying a scalability layer for the at least one sample.

In yet another aspect the exemplary embodiments in accordance with this invention provide an apparatus that includes a processor and a memory unit coupled with the processor. The apparatus further includes computer code configured to store first timing data into a track box of a media file, the first timing data describing decoding time of at least one sample of a coded multimedia content stored within an associated media data box of the media file; computer code configured to store alternate decoding time data for the at least one sample of the coded multimedia content, the alternate decoding time data being expressed as a delta value that represents an adjustment for the decoding time of the at least one sample; and computer code configured to store an identifier identifying a scalability layer for the at least one sample.

In a still further aspect the exemplary embodiments in accordance with this invention provide an apparatus that includes a processor and a memory unit operatively connected to the processor. The apparatus further includes computer code to parse a media file comprising a media bitstream and first timing data describing decoding time of at least one sample of the media bitstream; computer code to determine whether to one of decode the media bitstream in its entirety and decode a subset of the media bitstream; upon a determination to decode the subset of the media bitstream, parse an alternate decoding timing data for the at least one sample of the subset of the media bitstream; computer code configured to decode the subset of media bitstream according to the alternate decoding timing data; and computer code configured to parse an identifier identifying a scalability layer for the at least one sample.

BRIEF DESCRIPTION OF THE DRAWINGS

The foregoing and other advantages and features of the exemplary embodiments of this invention, together with the organization and manner of operation thereof, will become apparent from the following detailed description when taken in conjunction with the accompanying drawings, wherein like elements have like numerals throughout the several drawings described below.

FIGS. 5A-5C present various embodiments of Storing Alternative Decoding Time Data shown in Block 5B of FIG. 5.

FIGS. 6A-6D present various embodiments of Storing an Alternate Decoding Time Data shown in Block 6B of FIG. 6.

FIG. 9 presents a computer readable medium, such as the memory shown in FIG. 4, and illustrates a container file stored in the memory.

DETAILED DESCRIPTION OF THE EXEMPLARY EMBODIMENTS

Described below are exemplary methods, computer programs and apparatus that provide an ability to signal multiple decoding times for each sample in a file format level in order to allow, for example, different decoding times for each sample or sample subset between decoding an entire stream and decoding a subset of the stream. An alternate decoding time box is specified to allow for the signaling of multiple decoding times for each sample. Such a box can contain a compact version of a table that allows indexing from an alternate decoding time to a sample number, where an alternate decoding time is a decoding time to be used with a sample when only a subset of an elementary stream stored in a track is to be decoded. Furthermore, each entry in the table provides the number of consecutive samples with the same time delta, and the delta between those consecutive samples. Therefore, by adding the deltas a complete time-to-sample map can be constructed. Implementation of the various exemplary embodiments allows, for example, different decoding times for a sample or a sample subset between decoding the entire stream and decoding a subset of the stream. The various exemplary embodiments of the invention may be implemented without additional elements and/or computational complexity to storage servers/elements.

Figure 1:
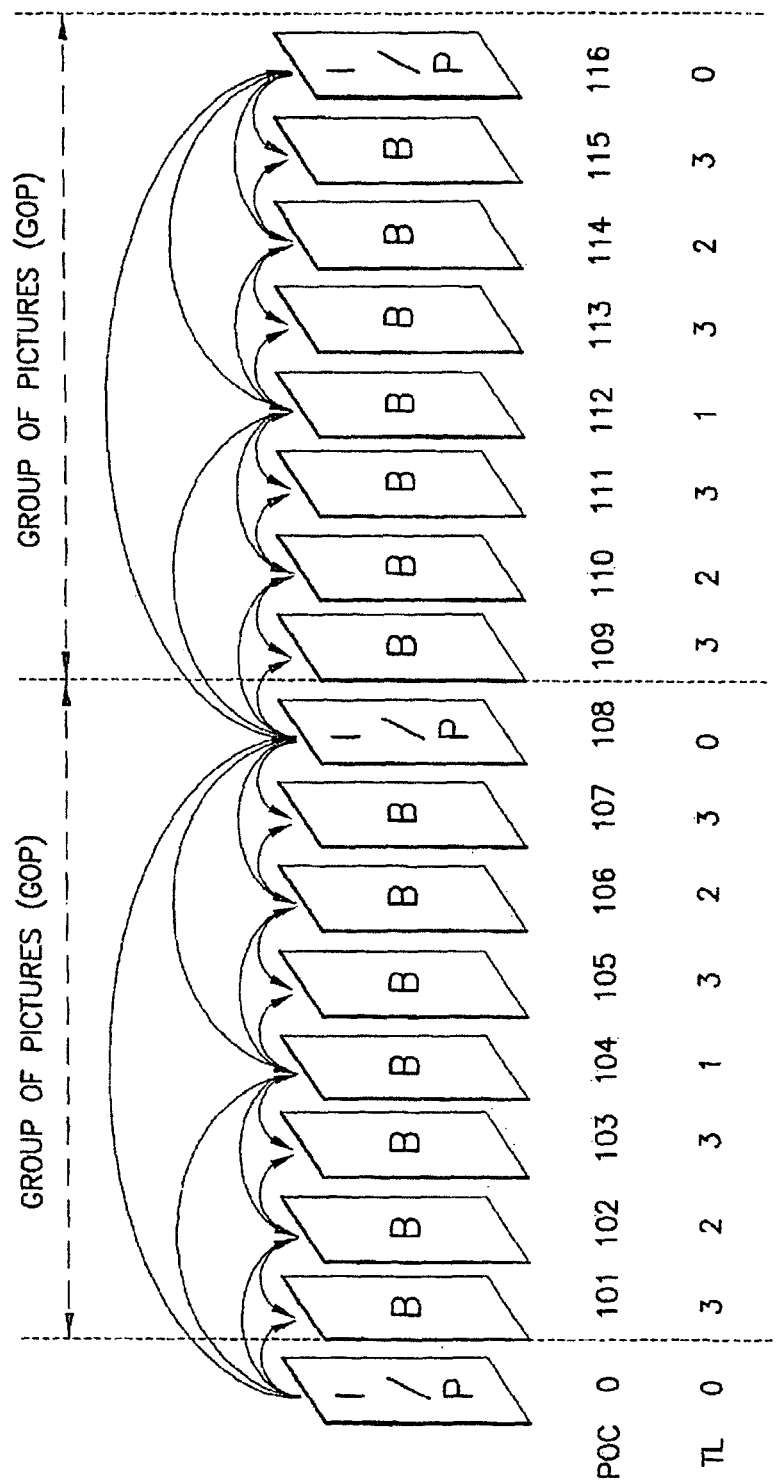
FIG. 1 shows a conventional hierarchical structure of four temporal scalable layers.
Figure 2:
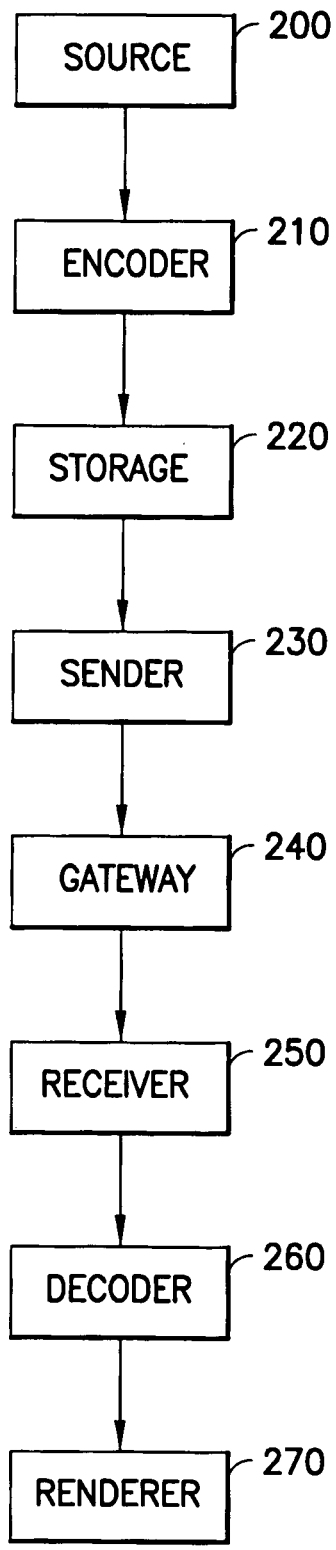
FIG. 2 shows a generic multimedia communications system for use with the present invention.

FIG. 2 shows a generic multimedia communications system for use with the present invention. As shown in FIG. 2, a data source 200 provides a source signal in an analog, uncompressed digital, or compressed digital format, or any combination of these formats. An encoder 210 encodes the source signal into a coded media bitstream. The encoder 210 may be capable of encoding more than one media type, such as audio and video, or more than one encoder 210 may be required to code different media types of the source signal. The encoder 210 may also get synthetically produced input, such as graphics and text, or it may be capable of producing coded bitstreams of synthetic media. In the following, only processing of one coded media bitstream of one media type is considered to simplify the description. It should be noted, however, that typical real time broadcast services comprise several streams (typically at least one audio, video and text sub-titling stream). It should also be noted that the system may include many encoders, but in the following only one encoder 210 is considered to simplify the description without a lack of generality.

It should be understood that, although text and examples contained herein may specifically describe an encoding process, one skilled in the art would readily understand that the same concepts and principles also apply to the corresponding decoding process and vice versa.

The coded media bitstream is transferred to a storage 220. The storage 220 may comprise any type of mass memory to store the coded media bitstream. The format of the coded media bitstream in the storage 220 may be an elementary self-contained bitstream format, or one or more coded media bitstreams may be encapsulated into a container file. Some systems operate "live", i.e. omit storage and transfer coded media bitstream from the encoder 210 directly to a sender 230. The coded media bitstream is then transferred to the sender 230, also referred to as the server, on a need basis. The format used in the transmission may be an elementary self-contained bitstream format, a packet stream format, or one or more coded media bitstreams may be encapsulated into a container file. The encoder 210, the storage 220, and the sender 230 may reside in the same physical device or they may be included in separate devices. The encoder 210 and the sender 230 may operate with live real time content, in which case the coded media bitstream is typically not stored permanently, but rather buffered for small periods of time in the content encoder 210 and/or in the sender 230 to smooth out variations in processing delay, transfer delay, and coded media bitrate.

The sender 230 sends the coded media bitstream using a communication protocol stack. The stack may include but is not limited to Real-Time Transport Protocol (RTP), User Datagram Protocol (UDP), and Internet Protocol (IP). When the communication protocol stack is packet-oriented, the sender 230 encapsulates the coded media bitstream into packets. For example, when RTP is used, the sender 230 encapsulates the coded media bitstream into RTP packets according to an RTP payload format. Typically, each media type has a dedicated RTP payload format. It should be again noted that a system may contain more than one sender 230, but for the sake of simplicity, the following description only considers one sender 230.

The sender 230 may or may not be connected to a gateway 240 through a communication network. The gateway 240 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. Examples of gateways 240 include multipoint conference control units (MCUs), gateways between circuit-switched and packet-switched video telephony, Push-to-talk over Cellular (PoC) servers, IP encapsulators in digital video broadcasting-handheld (DVB-H) systems, or set top boxes that forward broadcast transmissions locally to home wireless networks. When RTP is used, the gateway 240 is called an RTP mixer and acts as an endpoint of an RTP connection.

The system includes one or more receivers 250, typically capable of receiving, de-modulating, and de-capsulating the transmitted signal into a coded media bitstream. The coded media bitstream is typically processed further by a decoder 260, whose output is one or more uncompressed media streams. Finally, a renderer 270 may reproduce the uncompressed media streams with a loudspeaker or a display, for example. The receiver 250, the decoder 260, and the renderer 270 may reside in the same physical device or they may be included in separate devices.

It should be noted that the bitstream to be decoded can be received from a remote device located within virtually any type of network. Additionally, the bitstream can be received from local hardware or software.

Scalability in terms of bitrate, decoding complexity, and picture size is a desirable property for heterogeneous and error prone environments. This property is desirable in order to counter limitations such as constraints on bit rate, display resolution, network throughput, and computational power in a receiving device.

Communication devices of the present invention may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 3:
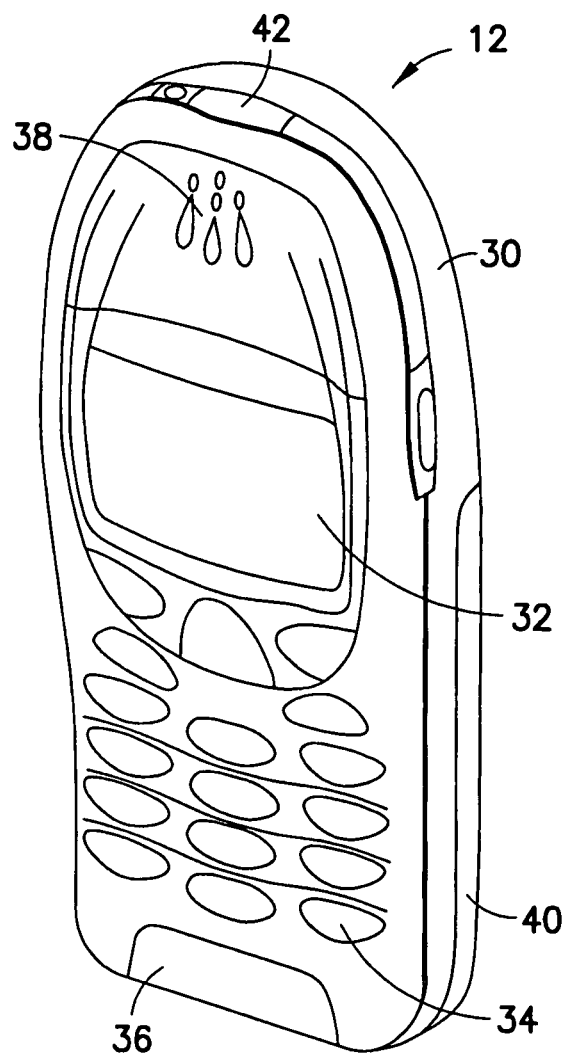
FIG. 3 is a perspective view of a mobile device that can be used in the implementation of the present invention.
Figure 4:
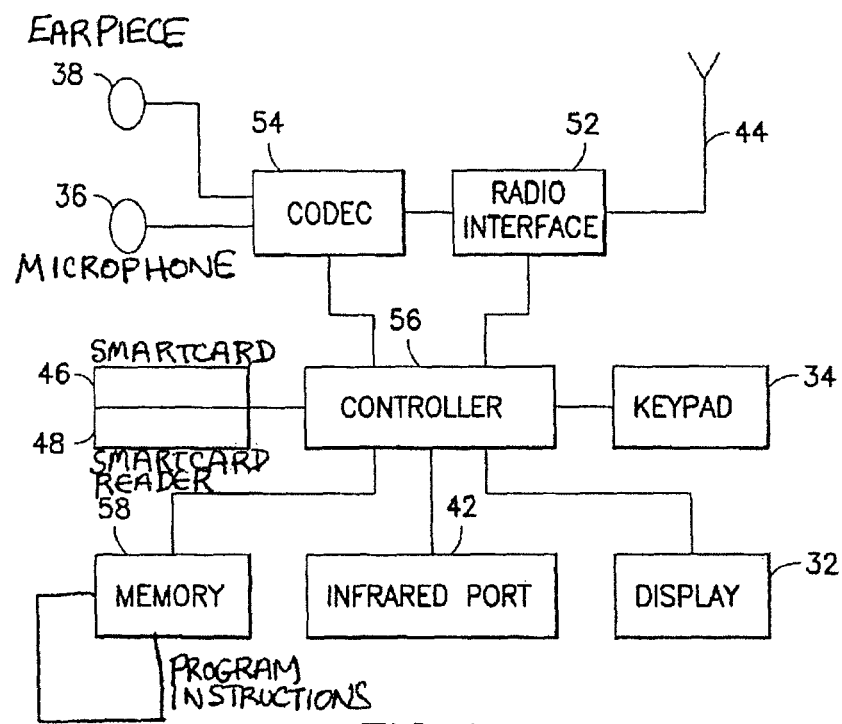
FIG. 4 is a schematic representation of the device circuitry of the mobile device of FIG. 3.

FIGS. 3 and 4 show one representative mobile device 12 within which the present invention may be implemented. It should be understood, however, that the present invention is not intended to be limited to one particular type of mobile device 12 or other electronic device. Some or all of the features depicted in FIGS. 3 and 4 could be incorporated into any or all of the devices represented in FIG. 2.

The mobile device 12 of FIGS. 3 and 4 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. Individual circuits and elements are all of a type well known in the art, for example in the Nokia range of mobile telephones.

Various embodiments provide the ability to signal multiple decoding times for each sample in a file format level to allow, for example, different decoding times for a sample or a sample subset between decoding an entire stream and decoding a subset of the stream. In addition, various embodiments can also be implemented without additional elements and/or computational complexity to storage servers/elements, e.g., the storage 220 of FIG. 2.

According to a first embodiment, a "box", which can be referred to as an alternate decoding time box, is specified as follows to allow for the signaling of multiple decoding times for each sample:

| | |
|---|---|
| Group Type: | "adts" |
| Container: | Sample Table Box ('stbl') |
| Mandatory: | No |
| Quantity: | Zero or More (one for each layer) |

Such a box can contain a compact version of a table that allows indexing from an alternate decoding time to a sample number, where, as described above, the time structure of a file is represented by tracks containing sequences of samples in time. The alternate decoding time is a decoding time to be used with a sample when it is determined that only a subset of an elementary stream stored in a track is to be decoded. Otherwise, the conventional decoding time, as allowed by the ISO base media file format and its derivatives can be utilized when the entire elementary stream is to be decoded. Furthermore, each entry in the table provides the number of consecutive samples with the same time delta, and the delta between those consecutive samples. Therefore, by adding the deltas a complete time-to-sample map can be constructed.

In addition, the box can contain alternate decoding time deltas, where $ADT(n+1)$ $ADT(n)+sample\_delta(n)$, $ADT(n)$ being the alternate decoding time of a sample n, and sample_delta(n) being the (uncompressed) table entry for a sample n. The ADT axis has a zero origin, where $ADT(i)=SUM(for\ j=0\ to\ i-1\ of\ sample\_delta(j))$, and the sum of all deltas gives the length of the particular media in the track. It should be noted that this length of the particular media in the track may be less than the overall duration of the movie that may contain edit lists. It should also be noted that the deltas may be equal to zero.

The box can be characterized by the following syntax structure:

```
aligned(8) class AlternateDecodingTimeBox
    extends FullBox("adts", version = 0, 0) {
    unsigned int(32)    operation_point;
    unsigned int(32)    entry_count;
        int i;
    for (i=0; i < entry_count; i++) {
        unsigned int(32)    sample_count;
        unsigned int(32)    sample_delta;
    }
}
```

In addition, the semantics of the syntax structure for the box described above are as follows:
version is an integer that specifies the version of this box;
operation_point is an integer that specifies an operation point for which the decoding times signaled in this box should be used. It should be noted that an operation point corresponds to a decoding of a subset of the elementary stream stored in the track. It should also be noted that a value of operation_point can be equal to a value of the tierId element, which is representative of a SVC file format scalability layer. In addition, for a stream with only temporal scalability, operation_point can be equal to the identifier of the temporal layer, e.g., the temporal_id element in SVC, or the sub_seq_layer_id element in AVC;

entry_count is an integer that gives the number of entries in a following table;
sample_count is an integer that counts the number of consecutive samples that have a given alternate decoding time delta; and
sample_delta is an integer that gives the delta of the alternative decoding times between the samples in the time-scale of the media.

According to a second embodiment, in the alternate decoding time box specified above, the sample-delta field is coded as "int(32)" instead of "unsigned int(32)." Therefore, the sample_delta field can give an offset between an alternate decoding time and a conventional decoding time for decoding the entire stream for the same sample according to the "Decoding Time to Sample Box." In other words, if the decoding time according to the Decoding Time to Sample Box for sample n is DT(n), the alternate decoding time can be represented by ADT(n)=DT(n)+sample_delta(n).

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module", as used herein and in the claims, is intended to encompass implementations using one or more lines of software code, and/or hardware implementations, and/or equipment for receiving manual inputs.

Based on the foregoing it should be apparent that the exemplary embodiments of this invention provide a method, apparatus and computer programs to enhance the operation of media file encoders and decoders.

For example, and referring to FIG. 5, in accordance with a method, and a result of execution of computer program instructions, at Block 5A there is performed storing first timing data into a track box of a media file, the first timing data describing decoding time of at least one sample of a coded multimedia content stored within an associated media data box of the media file, and at Block 5B there is performed storing alternate decoding time data for the at least one sample of the coded multimedia content, the alternate decoding time data being expressed as a delta value that represents an adjustment for the decoding time of the at least one sample.

Further by example, and referring to FIG. 6, in accordance with another method, and a result of execution of computer program instructions, at Block 6A there is performed storing first timing data into a track box of a media file, the first timing data describing decoding time of at least one sample of a coded multimedia content stored within an associated media data box of the media file, and at Block 6B there is performed storing an alternate decoding timing data for the at least one sample of the coded multimedia content for use if a subset of the coded multimedia content is to be decoded.

Figure 7:
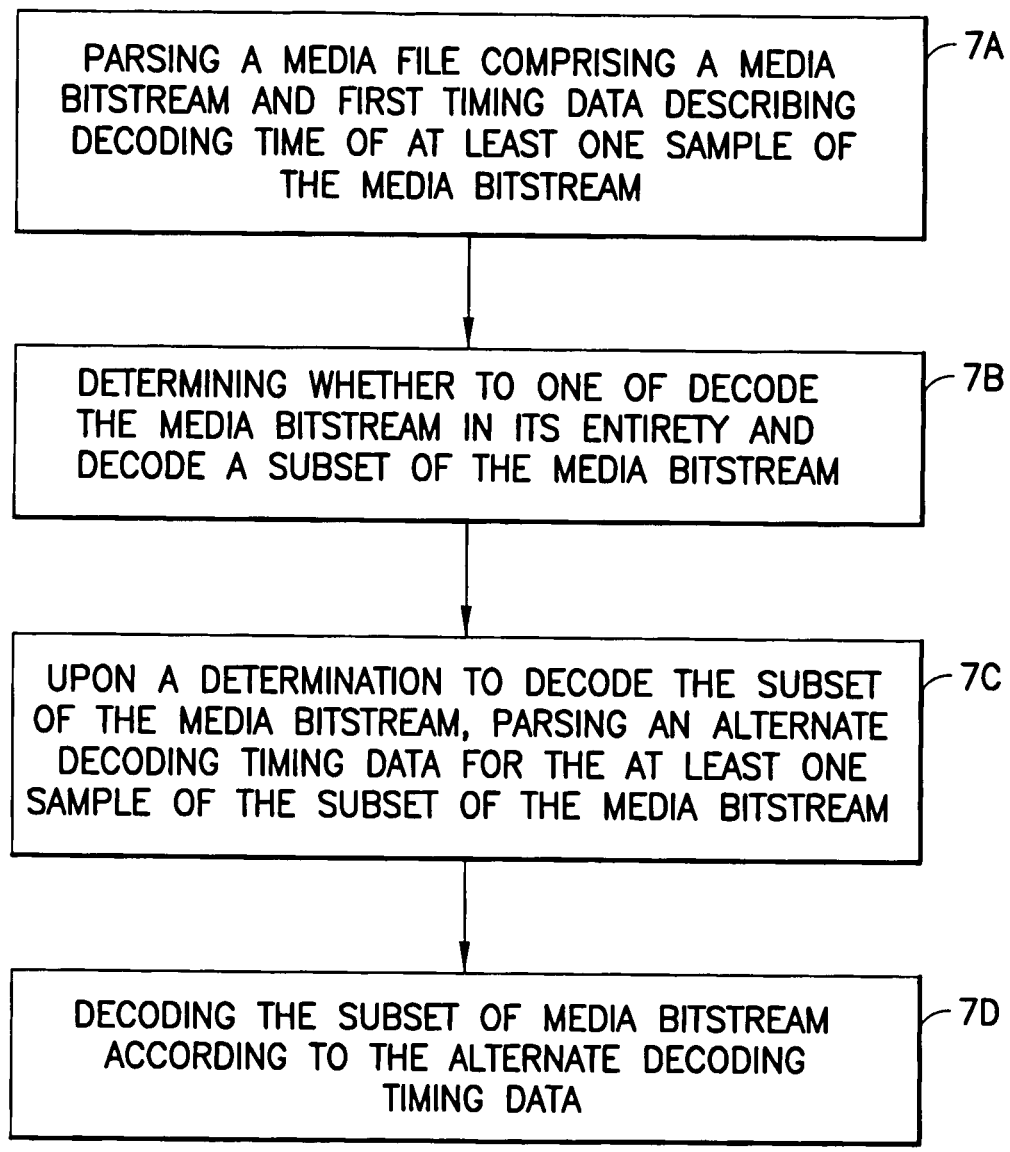
FIG. 7 is another logic flow diagram that illustrates the operation of a method, and a result of execution of computer program instructions, in accordance with the exemplary embodiments of this invention.
Figure 8A:
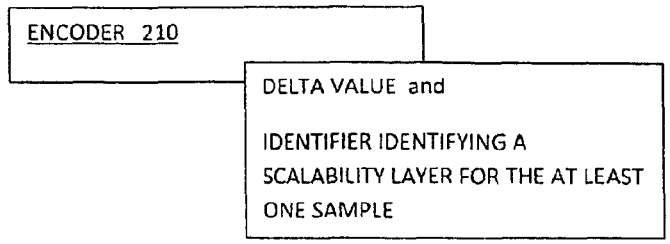
FIGS. 8A-8C present various embodiments of the encoder shown in FIG. 2 and information stored at the encoder.
Figure 8B:
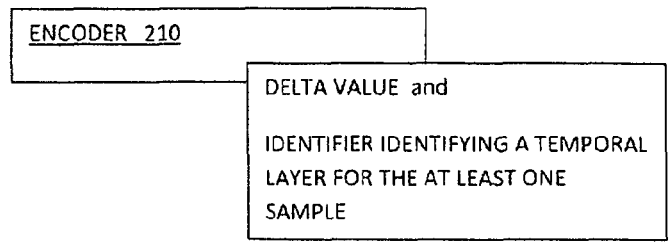
Figure 8C:
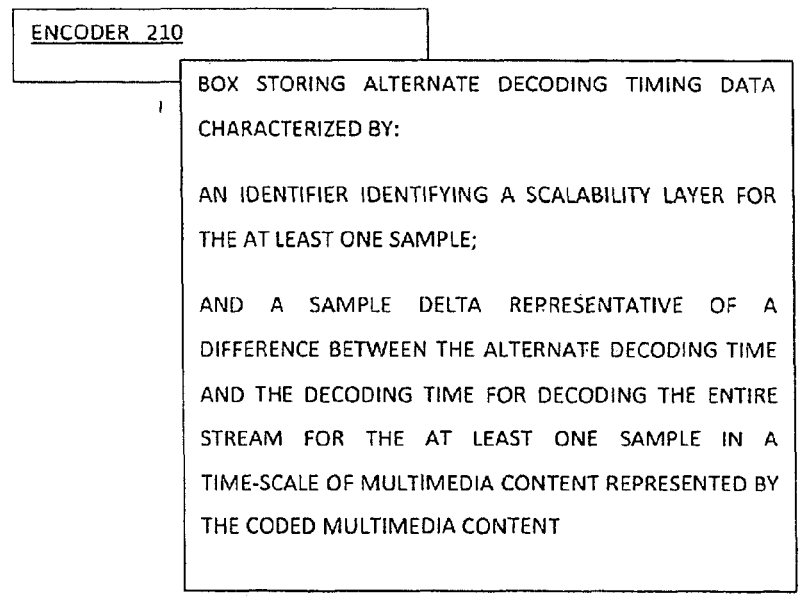
Figure 10:
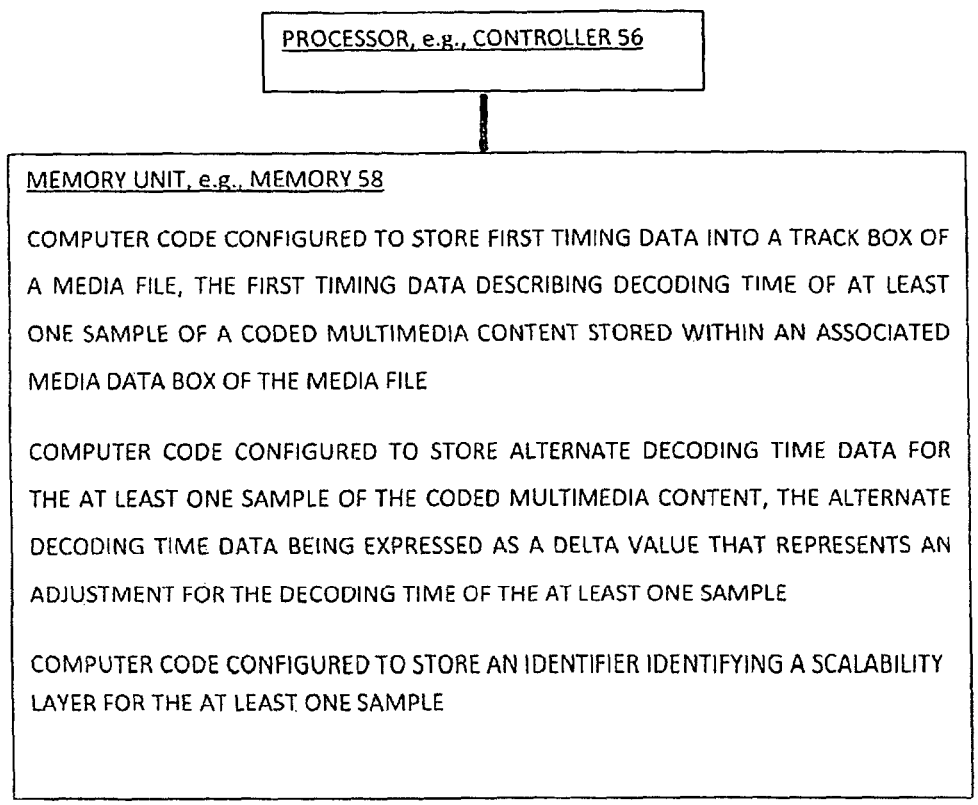
FIG. 10 is a simplified block diagram of an apparatus having a processor, such as the controller shown in FIG. 4, and a memory unit, such as the memory shown in FIG. 4, and illustrates computer code stored in the memory for execution by the processor.

Further by example, and referring to FIG. 7, in accordance with another method, and a result of execution of computer program instructions, at Block 7A there is performed parsing a media file comprising a media bitstream and first timing data describing decoding time of at least one sample of the media bitstream; at Block 7B there is performed determining whether to one of decode the media bitstream in its entirety and decode a subset of the media bitstream; at Block 7C there is performed, upon a determination to decode the subset of the media bitstream, parsing an alternate decoding timing data for the at least one sample of the subset of the media bitstream; and at Block 7D decoding the subset of media bitstream according to the alternate decoding timing data.

The various blocks shown in FIGS. 5, 6 and 7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of certain video coding standards it should be appreciated that the exemplary embodiments of this invention are not limited for use with only the specifically mentioned video coding standards, and that they may be used to advantage in other video and other media-related standards and file types and systems.

It should be noted that the terms "connected", "coupled", or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
    storing first timing data into a track box of a media file, the first timing data describing decoding time of at least one sample of a coded multimedia content stored within an associated media data box of the media file; and
    storing alternate decoding time data for the at least one sample of the coded multimedia content, the alternate decoding time data being expressed as a delta value that represents an adjustment for the decoding time of the at least one sample, and where the alternate decoding time is a decoding time to be used with a sample when it is determined that only a subset of an elementary stream stored in a track is to be decoded.

2. The method of claim 1, wherein storing alternate decoding time data stores, in association with the delta, an identifier identifying a scalability layer for the at least one sample.

3. The method of claim 1, wherein storing alternate decoding time data stores, in association with the delta, an identifier identifying a temporal layer for the at least one sample.

4. The method of claim 1, wherein the alternate decoding timing data is stored in a box, the box being characterized by:
    an identifier identifying a scalability layer for the at least one sample; and
    a sample delta representative of a difference between the alternate decoding time and a decoding time for decoding the entire stream for the at least one sample in a time-scale of multimedia content represented by the coded multimedia content.

5. A non-transitory computer readable medium that stores program instructions, the execution of the program instructions resulting in performance of operations comprising:
    storing first timing data into a track box of a media file, the first timing data describing decoding time of at least one sample of a coded multimedia content stored within an associated media data box of the media file; and
    storing alternate decoding time data for the at least one sample of the coded multimedia content, the alternate decoding time data being expressed as a delta value that represents an adjustment for the decoding time of the at least one sample, and where the alternate decoding time is a decoding time to be used with a sample when it is determined that only a subset of an elementary stream stored in a track is to be decoded.

6. A method, comprising:
    storing first timing data into a track box of a media file, the first timing data describing decoding time of at least one sample of a coded multimedia content stored within an associated media data box of the media file; and
    storing an alternate decoding timing data for the at least one sample of the coded multimedia content for use if a subset of the coded multimedia content is to be decoded, where the alternate decoding time is a decoding time to be used with a sample when it is determined that only a subset of an elementary stream stored in a track is to be decoded.

7. The method of claim 6, wherein the alternate decoding time data is expressed as a delta value that represents an adjustment for the decoding time of the at least one sample.

8. The method of claim 6, wherein storing alternate decoding time data stores, in association with the delta, an identifier identifying a scalability layer for the at least one sample.

9. The method of claim 6, wherein storing alternate decoding time data stores, in association with the delta, an identifier identifying a temporal layer for the at least one sample.

10. The method of claim 6, wherein the alternate decoding timing data is stored in a box, the box being characterized by:
    an identifier identifying a scalability layer for the at least one sample; and
    a sample delta representative of a difference between the alternate decoding time and a decoding time for decoding the entire stream for the at least one sample in a time-scale of multimedia content represented by the coded multimedia content.

11. A non-transitory computer readable medium that stores program instructions, the execution of the program instructions resulting in performance of operations comprising:
    storing first timing data into a track box of a media file, the first timing data describing decoding time of at least one sample of a coded multimedia content stored within an associated media data box of the media file; and
    storing an alternate decoding timing data for the at least one sample of the coded multimedia content for use if a subset of the coded multimedia content is to be decoded, where the alternate decoding time is a decoding time to be used with a sample when it is determined that only a subset of an elementary stream stored in a track is to be decoded.

12. An apparatus, comprising:
    a processor; and
    a memory unit coupled with the processor and further comprising:
    an encoder configured to:
        store first timing data into a track box of a media file, the first timing data describing decoding time of at least one sample of a coded multimedia content stored within an associated media data box of the media file; and
        store alternate decoding time data for the at least one sample of the coded multimedia content, the alternate decoding time data being expressed as a delta value that represents an adjustment for the decoding time of the at least one sample, and where the alternate decoding time is a decoding time to be used with a sample when it is determined that only a subset of an elementary stream stored in a track is to be decoded.

13. The apparatus of claim 12, wherein the encoder stores, in association with the delta, an identifier identifying a scalability layer for the at least one sample.

14. The apparatus of claim 12, wherein the encoder stores, in association with the delta, an identifier identifying a temporal layer for the at least one sample.

15. The apparatus of claim 12, wherein the alternate decoding timing data is stored in a box, the box being characterized by:
    an identifier identifying a scalability layer for the at least one sample; and
    a sample delta representative of a difference between the alternate decoding time and a decoding time for decoding the entire stream for the at least one sample in a time-scale of multimedia content represented by the coded multimedia content.

16. A non-transitory computer readable medium that stores a container file comprising:
   a plurality of tracks;
   first timing data contained in a track box, the first timing data describing decoding time of at least one sample of a coded multimedia content stored within an associated media data box;
   alternate timing data contained in the box for signaling the alternate timing data for the at least one sample of the coded multimedia content, the alternate decoding time data being expressed as a delta value that represents an adjustment for the decoding time of the at least one sample, where the alternate decoding time is a decoding time to be used with a sample when it is determined that only a subset of an elementary stream stored in a track is to be decoded; and
   an identifier identifying a scalability layer for the at least one sample.

17. An apparatus, comprising:
   a processor; and
   a memory unit coupled with the processor and further comprising:
   computer code configured to store first timing data into a track box of a media file, the first timing data describing decoding time of at least one sample of a coded multimedia content stored within an associated media data box of the media file; and
   computer code configured to store alternate decoding time data for the at least one sample of the coded multimedia content, the alternate decoding time data being expressed as a delta value that represents an adjustment for the decoding time of the at least one sample, where the alternate decoding time is a decoding time to be used with a sample when it is determined that only a subset of an elementary stream stored in a track is to be decoded; and
   computer code configured to store an identifier identifying a scalability layer for the at least one sample.

* * * * *